United States Patent [19]
Deus

[11] Patent Number: 5,738,406
[45] Date of Patent: Apr. 14, 1998

[54] AIR, GEL OR WATER FILLED BICYCLE SEAT

[76] Inventor: Janet Lee Deus, 4265 Tara Ave. #8, Las Vegas, Nev. 89102

[21] Appl. No.: 722,997

[22] Filed: Sep. 30, 1996

[51] Int. Cl.⁶ .................................................. B62J 1/26
[52] U.S. Cl. ............... 297/200; 297/452.41; 297/DIG. 3
[58] Field of Search ................................ 297/200, 199, 297/195.1, DIG. 3, 452.41, 284.6; 5/672, 654, 655.5, 909, 655.3, 708

[56] References Cited

U.S. PATENT DOCUMENTS

| | | | |
|---|---|---|---|
| 540,725 | 6/1895 | Craig | 297/200 |
| 1,198,687 | 9/1916 | Williams et al. | 297/DIG. 3 X |
| 3,982,786 | 9/1976 | Burgin et al. | 297/DIG. 3 X |
| 3,984,886 | 10/1976 | Keeton | 5/654 X |
| 4,433,708 | 2/1984 | Hashimoto et al. | 297/DIG. 3 X |
| 4,514,010 | 4/1985 | Sabater González | 297/451.41 X |
| 5,135,282 | 8/1992 | Pappers | 297/284.6 X |
| 5,330,249 | 7/1994 | Weber et al. | 297/199 X |
| 5,419,612 | 5/1995 | Rassekhi | 297/452.41 X |
| 5,513,899 | 5/1996 | Michaels et al. | 297/452.41 |
| 5,548,948 | 8/1996 | Smith et al. | 5/654 X |

FOREIGN PATENT DOCUMENTS

| | | | |
|---|---|---|---|
| 98346 | 3/1940 | Sweden | 297/200 |
| 14628 | 7/1895 | United Kingdom | 297/199 |

*Primary Examiner*—Milton Nelson, Jr.
*Attorney, Agent, or Firm*—Patent & Trademark Services; Thomas Zack; Joseph H. McGlynn

[57] ABSTRACT

A custom fitted seat having internal fluid compartments whose fluid pressure may be adjusted. Each compartment is in fluid communication with adjoining compartments through a system of one-way valves. There also are release or relief valves in each compartment to reduce the fluid pressure therein and at least one fluid port inlet for the compartments. Pressurized fluid such as air, gel, water or any combination thereof, may be introduced into the compartments via the fluid port inlet by a hand operated squeeze pump. This pump may contain air or be filled with a gel or water or other fluid contained in a separate container introduced to the pump via its own inlet port. The seat components can be manufactured using the electronically heat welded vinyl process and the hand pump by the blow molding process.

3 Claims, 1 Drawing Sheet

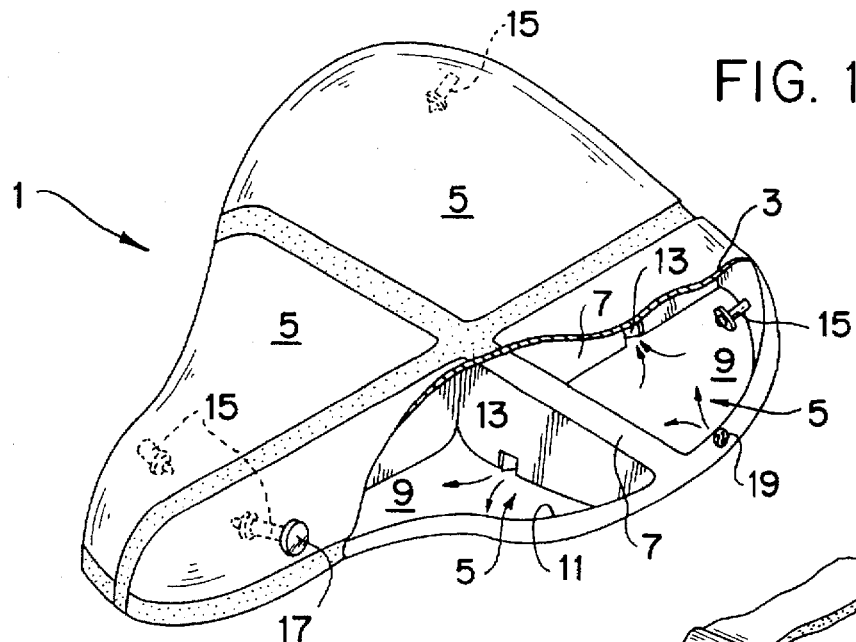
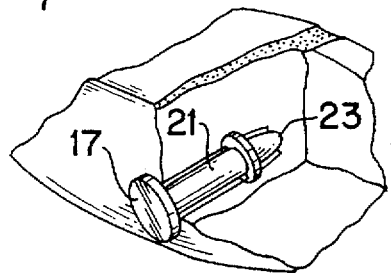
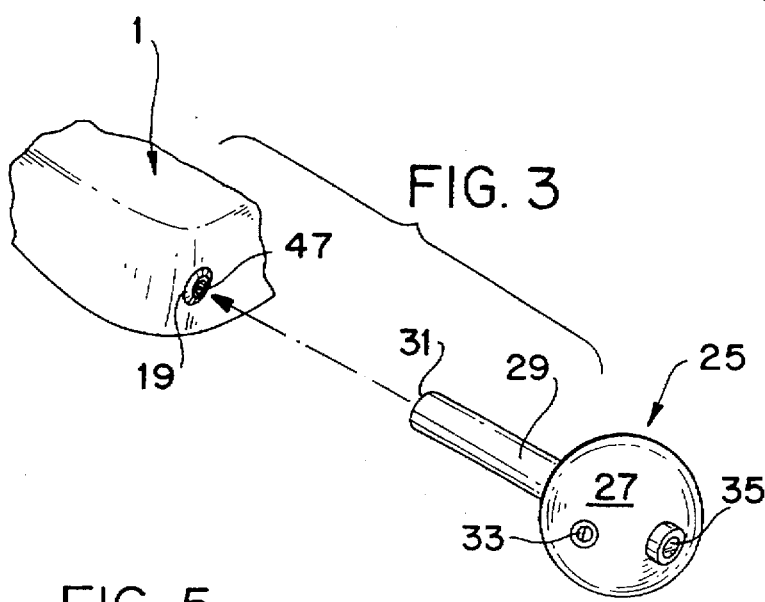
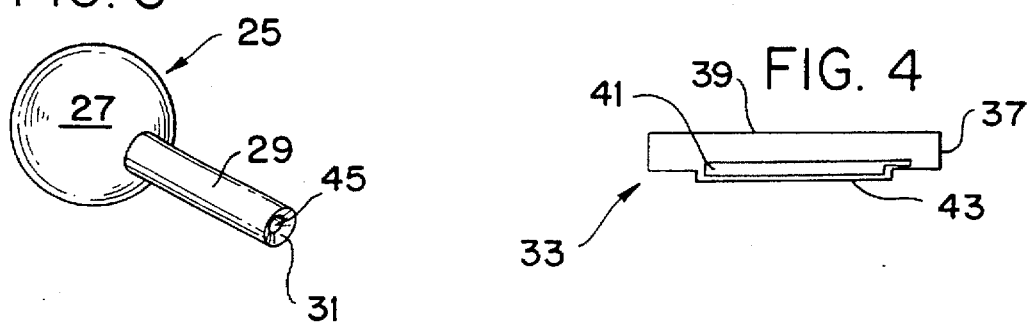

AIR, GEL OR WATER FILLED BICYCLE SEAT

BACKGROUND OF THE INVENTION

When a person sits for an extended period of time on a seating cushion such as a bicycle or motorcycle seat, the necessity to provide padding is readily apparent. Such padding can take various forms. Custom fitting the seat to the particular user's buttock engaging dorsal has been attempted with some success. The present invention seeks not only to improve upon the custom fitting of such engagements but to allow flexibility in customizing the same seat to different user's needs and individual configurations.

DESCRIPTION OF THE PRIOR ART

Many of the prior art seats have provided for seat padding. For example, in the two U.S. Pat. Nos. 4,952,439 and 5,147,685 to Hanson, a flow able material and/or low compression set foam is used to pad the seat. In the Wang reference (U.S. Pat. No. 5,318,344) a detachable bike cover seat with an upper portion having cells filled with a pressurized fluid is disclosed. And in the U.S. Pat. No. 5,388,887 to Read a seat with a shell having padding thereon is described. The present invention provides for a cushion seat having communicating compartments with one-way valves. A fluid substance such as gel or air is pumped into the various compartments to custom fit the seat or cover to the user. Adjustments to the amount of fluid in a compartment are made via an exit port to the excess fluid to be removed all as set forth in this specification.

SUMMARY OF THE INVENTION

A custom fitted seat having a series of interconnected and communicating compartments. One-way valves permit entry of pumped fluid into these compartments. If there is an excess of fluid in a particular compartment, an exit port in each compartment may be opened to adjustment of the amount of fluid.

It is the primary object of the present invention to provide for an improved custom fitted seat.

Another object is to provide for a custom fitted seat used on a bicycle or the like whose amount underlying fluid support may be adjusted by the user.

These and other objects and advantages of the present invention will become apparent to readers from a consideration of the ensuing description and the accompanying drawings.

BRIEF DESCRIPTION OF THE DRAWINGS

FIG. 1 a cut away partial sectional perspective view of the invention's preferred embodiment.

FIG. 2 shows an enlarged perspective view of the compartment's release valve.

FIG. 3 is an exploded enlarged perspective view of the fluid pump used to inject fluid into the seat compartments.

FIG. 4 is an enlarged side view of the pump's one-way air valve.

FIG. 5 shows the FIG. 3 pump, in perspective, as viewed from its seat injection port engaging side.

DESCRIPTION OF THE PREFERRED EMBODIMENT

FIG. 1 is a cut away partial sectional perspective view of the invention's preferred embodiment. A conventionally triangularly shaped bicycle seat 1 may have an outer surface covering 3 material made from welded vinyl. Under this covering are four separate fluid-tight bladder-like compartments 5. The bright front and rear compartments are shown in the partial cutaway section view in FIG. 1. Two separating compartment walls 7 intersect each other to define limits for these four compartments. In addition to walls 7, each compartment also has defining limits made up of the floor 9, the outer generally triangular shaped surface perimeter 11 and the upper covering 3. One-way fluid valves 13 (two shown) on walls 7 between each compartment permit fluid communication between each adjoining compartment. Each compartment has its own external release valve 15 with a cap 17 which extends from inside the compartments interior cavity to the outside cap on one of the seat's sides. This release or relief valve 15 can be used to empty the confined fluid within a compartment by removing its end cap 17. Fluid is inputted by a hand operated squeeze pump into the connecting compartments through inlet valve 19 located on the right rear compartment's side wall.

FIG. 2 shows a enlarged perspective view of one of the compartment's release valves 15. The other release valves have the same structure. The plug-in end cap 17 blocks fluid from entering into the valve's elongated hollow cylinder 21 which extends into the compartment's cavity and exits at end opening 23. When cap 17 is pulled out, contained fluid exits from the compartment and is released.

FIG. 3 is an exploded enlarged perspective view of the fluid pump 25 used to inject fluid into the seat compartments through inlet valve port 19. Essentially the pump 25 consist of a ball-like squeeze operated member 27 and an extending connected tubular member 29 whose hollow end opened portion 31 is configured to engage port 19. The squeeze ball 27 has its own inlet one-way air valve port 33 and a normally closed fluid filling port 35 which interfaces with the nozzle (not shown) of a containment bottle. This bottle contains the particular fluid that will be used to fill the compartments 5, when closed port 35 is opened, after the bottle's contents has been placed into squeeze ball 27. Examples, of some fluids that could be injected into port 35 and the compartments include water or gel.

FIG. 4 is an enlarged side view of the pump's one-way air input valve 33. This valve emits air into the interior of the pump's ball 27 through an inwardly opening hinged (37) main valve body component 39 located on the: ball's wall. External of this body component is the flap valve component 41 which functions to block the outward flow of air or any confined fluid in ball 27 through valve air input opening 43.

FIG. 5 shows the FIG. 3 pump, in perspective, as viewed from its seat injection port engaging side. As shown, the engaging opened end portion 31 has a concave configuration around the opening 45. This allows the pump's end to fit around the protruding nipple 47 which as a one-way injection valve at its center. When the pump's opened end 31 is firmly placed around the valve's nipple 47, any fluids in the pump's ball 27 may be pumped into the seat compartments by hand squeezing the ball.

When gel, water or other fluid is to be is injected into the compartments, the one-way air inlet valve 33 is blocked as the ball's other fluid is squeezed into the compartments. If air is to be pumped into the compartments, then inlet port 35 is left closed while inlet valve 33 allows more air to enter the ball as it is squeezed repeatedly. Once the fluid to be used to fill the compartments, such as air, gel or water, is placed into the seat's compartments, it is prevented from exiting through one-way valve 19. Should too much air, gel, water or other fluid be injected into a specific compartment, that compartment's relief valve cap plug 17 is removed to bleed the excess fluid. Thus, a certain amount of trial and error is used to customize the amount of the particular fluid in any one of the compartments depending on the individual desires of a particular user. Fluids placed in the compartments can be a mixture of different fluids such as air, water or gel or any other pump able fluids. As depicted, see FIG. 1, the flow of fluids would sequentially fill the right rear compartment, then flow into the left from, right rear and right front compartments.

The seat components can be manufactured using the electronically heat welded vinyl process. Vinyl may be die cut and heat welded together. The die cutting of sheet vinyl is a process which cuts vinyl into a specific shape through the use of steel ruled dies. Steel ruled dies are flat, sharpened pieces of steel which resemble a hacksaw blade. The dies are bent into the desired shape (in this case the seat) and held in place by channels cut out into a thick sheet of wood. In operation, the sharpened edges of the die are brought into face to face contact with a flat piece of vinyl. The die is pressed against the vinyl sheet, cutting it to the shape of the seat components. In this specific case, three components are cut out and welded together. The upper 3 and lower 5 seat portions are cut into the conventional shape of a bicycle seat, while thick vinyl is cut to form the walls 7 within the seat components. Before thee components are assembled, the one-way valves 13, and the relief valves 15, and inlet port 19 are installed into the thick edges or walls 7 and 11. Once, call valves are installed, all the vinyl components are welded together.

The electronic heat welding technique used to connect vinyl together (since it cannot easily be glued) works like this; high frequency waves are bought to bear on a mechanical horn which mechanically vibrates at the same frequency provided to it by an electronic circuit. The vibrations are so fast and powerful as to generate frictional heat in the connection the horn is pressed against. The connections heats to the point where it is melted or welded together. This type of connection is strong enough to provide a fluid tight leak proof seam in the seat compartments. The heat welding uses a radio frequency in it's welding process. Some of the most familiar products manufactured this way be check book covers and blow up toys such as beach balls and rafts.

The pump 25 components can be manufactured using the blow molding process. The process uses a parison (hollow tube) of plastic, and at minimum of a two part mold. This parison is heat softened and a two part cavity mold is placed around the tube. The mold pinches off one end of the tube while very hot air is blown into the other end of the plastic tube. This causes the tube to blow up like a balloon against the mold and take its shape. The two part mold is opened and the enclosure ejected and allowed to cool and harden. Thereafter second stage cutting and trimming by hand or machine can take place. Polyethylene plastic is often used in this process because of its waxy feeling and its ability to slide well within the mold. Textures can also be added to the outer surface to give it the appear of cross-hatching, grainy sand, leather, etc.

The internal one-way valves and injection port components of the preferred embodiment would best be manufactured using the plastic injection molding process. Injection molding is a plastic molding process whereby heat softened plastic material is forced under very high pressure into a metal cavity mold, usually aluminum or steel, which is relatively cool. The inside cavity of the mold is comprised of two or more halves, and is the same desired shape as the product to be formed (in this case the valves/ports). High pressure hydraulics are used to keep the mold components together during the actual injection phase of the molding process. The injected plastic is allowed to cool and harden in the mold. The hydraulics holding the multiple component mold cavity together are released, the mold halves are separated and the solid formed plastic item is removed. Injection molding can be highly automated process and is capable of producing extremely detailed parts at a very cost effective price. The process should be invaluable in producing this invention's valves/ports cost effectively.

It should be understood that the term bicycle seat as used herein is not necessarily restricted to a bicycle which rides on the ground. It also includes exercise bicycles and other like seats.

Although the Air, Gel Or Water Filled Bicycle Seat and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A custom fitted seat comprising:

an upper seat portion having a partially hollow interior;

a plurality of fluid tight walled adjoining compartments in said upper seat's hollow interior, each compartment being capable of receiving a pressurized fluid introduced therein and being in fluid communication with the other compartments;

each adjoining compartment wall having a one-way fluid valve located in its walls to permit fluid to exit therefrom into the adjoining compartment;

an inlet port located on said seat which is in fluid communication with at least one of said compartments;

a source of pressurized fluid for introducing fluid under pressure into one of said compartments through said inlet port; and a normally closed relief valve in each of said compartments for permitting the release of excess fluid pressure in that compartment from the seat to adjust the compartment's fluid pressure.

2. The invention as claimed in claim 1, wherein said source of pressurized fluid includes a hand operated pump which can be connected to said inlet port.

3. The invention as claimed in claim 2, wherein said hand operated pump includes a one-way air inlet valve and an inlet port for introducing other fluids into the pump and compartments.

* * * * *